United States Patent
Miura

[11] Patent Number: 5,844,694
[45] Date of Patent: Dec. 1, 1998

[54] FACSIMILE APPARATUS

[75] Inventor: Shigeo Miura, Tokyo, Japan

[73] Assignee: Canon Kabushiki Kaisha, Tokyo, Japan

[21] Appl. No.: 772,032

[22] Filed: Dec. 19, 1996

Related U.S. Application Data

[63] Continuation of Ser. No. 378,250, Jan. 24, 1995, abandoned.

[30] Foreign Application Priority Data

Jan. 26, 1994 [JP] Japan .................................. 6-023686

[51] Int. Cl.$^6$ ........................... H04N 1/00; G03G 21/20; G03G 15/00; G03G 15/20
[52] U.S. Cl. ........................ 358/468; 358/401; 358/404; 358/412; 399/33; 399/44; 399/94
[58] Field of Search ................................... 358/400, 401, 358/404, 406, 412, 434, 435, 436, 437, 438, 439, 441, 443, 468; 219/216; 346/76.1; 399/33, 44, 94

[56] References Cited

U.S. PATENT DOCUMENTS 5,068,675 11/1991 Momose .............................. 346/76 PH
5,300,981 4/1994 Shioya ..................................... 355/206

FOREIGN PATENT DOCUMENTS 4085645 3/1992 Japan .
6138792 5/1994 Japan .

*Primary Examiner*—Kim Yen Vu
*Assistant Examiner*—Kimberly A. Williams
*Attorney, Agent, or Firm*—Fitzpatrick, Cella, Harper & Scinto

[57] ABSTRACT

A facsimile apparatus comprises a first control unit for controlling communication processing of image data and an overall apparatus, a laser beam printer for feeding a record sheet through a heater mounted on a fixing unit to fix an image to the record sheet, a temperature detection unit for detecting temperatures in an area of the heater through which the record sheet is fed and an area of the heater through which the record sheet is not fed, and a second control unit for restricting the communication processing of the image data from the first control unit to the laser beam printer when the result of detection of the temperature of the area through which the record sheet is not fed by the temperature detection unit exceeds a predetermined temperature. The second control unit sends to the first control unit a flag when the result of detection of the temperature in the area through which the record sheet is not fed by the temperature detection unit exceeds a predetermined temperature. The first control unit includes a memory for storing page image data and sends the next page image data stored in the memory to the laser beam printer after the confirmation of the erasure of the flag from the second control unit. The first control unit reduces a transmission rate of the next image data reception when the amount of image data temporarily stored in the memory exceeds a predetermined level.

3 Claims, 5 Drawing Sheets

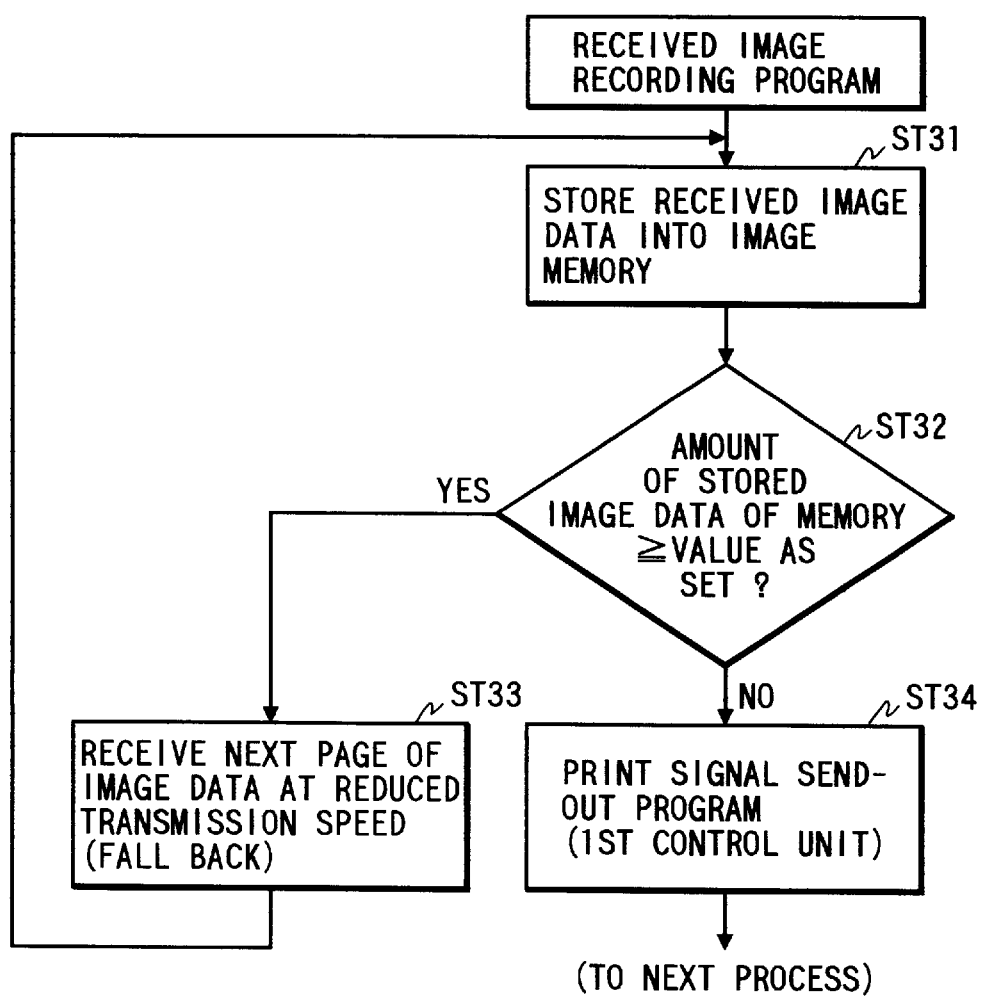

FACSIMILE APPARATUS

This application is a continuation of application Ser. No. 08/378,250 filed Jan. 24, 1995 now abandoned.

BACKGROUND OF THE INVENTION

1. Field of the Invention

The present invention relates to a facsimile apparatus having a laser beam printer, and more particularly to a facsimile apparatus for optimizing temperature control of a fixing unit (on-demand fixing unit) of the laser beam printer and image data recording.

2. Related Background Art

In a prior art facsimile apparatus equipped with a laser beam printer having an on-demand fixing unit, when a record sheet having a narrower sheet width than a width of a heater mounted on the on-demand fixing unit is to be fed through the on-demand fixing unit, a rise of temperature in an area of the heater through which the recording sheet is not fed (hereinafter referred to as a non-feed area) causes a problem. For example, when the heater width corresponds to the size B4 and the recording sheet is of size A4, the rise of temperature in the non-feed area through which the recording sheet is not fed causes a problem.

This is because a heat of an area of the heater through which the recording sheet is fed (hereinafter referred to as a feed area) is transferred to the recording sheet as the recording sheet is fed through so that it does not cause the temperature rise but the heat in the non-feed area through which the recording sheet is fed is accumulated more and more.

The temperature rise of the non-feed area adversely affects to a lifetime of a polyimide film and the heater of the on-demand fixing unit. As a result, it is not possible to feed a recording sheet having a narrower sheet width than the heater width of the on-demand fixing unit through the fixing unit.

As described above, in the facsimile apparatus having the on-demand fixing unit, the temperature rise in the non-feed area through which the recording sheet is not fed causes a problem, and in the prior art apparatus having the on-demand fixing unit, the size A4 sheet is fed through the heater of the size A4 width without making the non-feed area, or the heater size is selected to be smaller than the size A4 so that the length of the non-feed area, if any, is suppressed to a minimum.

On the other hand, there is a demand for a facsimile apparatus equipped with the on-demand fixing unit having a heater size of no smaller than the size B4 and there is a further demand that a recording sheet having a narrower width than the heater width can be fed in such a facsimile apparatus.

A problem raised here is the temperature rise in the non-feed area. Without solving this problem, it is not possible to realize the fixing of the recording sheet of a narrow width in the on-demand fixing unit having the heater width of no smaller than the size B4.

SUMMARY OF THE INVENTION

It is an object of the present invention to provide an improved facsimile apparatus in view of the above problems.

It is another object of the present invention to provide a facsimile apparatus which attains proper image recording without regard to a relation between the heater width of the fixing unit and the sheet width of the record sheet and avoids the undesired temperature rise of the heater of the fixing unit.

BRIEF DESCRIPTION OF THE DRAWINGS

FIG. 6 shows an operation flow chart of the facsimile apparatus of the embodiment.

DETAILED DESCRIPTION OF THE PREFERRED EMBODIMENTS

An embodiment of the present invention is described in detail.

Figure 1:
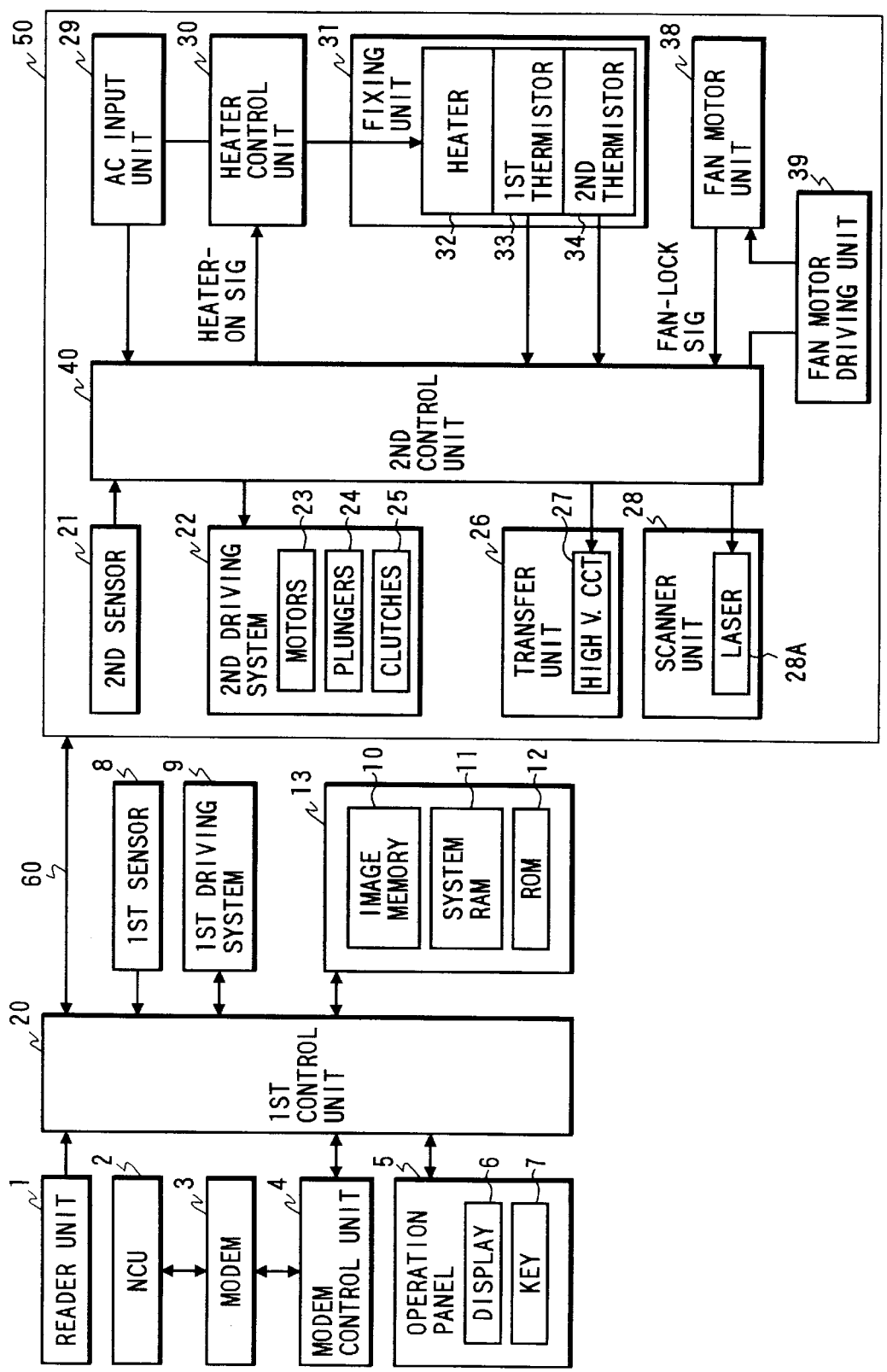
FIG. 1 shows a block diagram of an embodiment of a facsimile apparatus of the present invention.

FIGS. 1 to 5 show an embodiment of the present invention and FIG. 1 shows a block diagram of the facsimile apparatus of the present embodiment.

The facsimile apparatus shown in FIG. 1 comprises a document sheet reader unit 1 for converting a transmitting document to a read image data, a network control unit (NC) 2 for connecting a telephone line to the facsimile apparatus, a modem (modulator/demodulator) 3 for the communication, a modem control unit 4 for controlling the modem 3, an operation panel (or console panel) 5 including a display 6 for displaying a status of the facsimile apparatus to a user and a keyboard 7 through which the user commands various operations to the facsimile apparatus, a first sensor 8 for detecting the status of the facsimile apparatus, a first driving system 9 including a read motor for feeding the document sheet, a first control unit 20 and memory means 13 which comprises an image memory 10 for storing received image data, a system RAM (or system memory) 11 which is backed up by a battery for a power interruption such as by a power failure of a commercial power line and a ROM 12 for defining a specification of the facsimile apparatus. The first control unit 20 controls the operations of the above units and the reception and transmission of the image data.

The facsimile apparatus has an image record unit 50 which functions as a laser beam printer.

The image record unit 50 comprises a second sensor 21 for detecting various states, a motor 23 for feeding a record sheet, a plunger 24 for determining and controlling a driven part to be driven by the motor 23, a second drive unit 22 including a clutch 25 having the same function as the plunger for driving the recording system such as the record sheet feeder, a transfer unit 26 having a high voltage circuit 27 for generating a high voltage necessary for the transfer, a scanner unit 28 having a laser 28A for scanning the record sheet, an AC input unit 29 for receiving an AC power, a heater control unit 30 including a TRIAC for controlling an AC voltage applied to a heater 32 to be described later, a heater 32 for applying a heat to the record sheet for fixing an image, a thermal fixing unit 31 including temperature detection means having a first thermistor 33 for detecting a temperature of the feed area of the heater 32 and a second thermistor 34 for detecting a temperature of a non-feed area of the heater 32, a fan motor unit 38 for cooling the temperature in the apparatus, a fan motor driving unit 39 for driving the fan motor unit 38, and a second control unit 40 for controlling the overall image recording unit 50.

The first control unit 20 and the second control unit 40 are connected to a signal line 60.

The signal line 60 transmits the command and the record image data from the first control unit 20 to the second control unit 40 and the status from the second control unit 40 to the first control unit 20.

Figure 2:
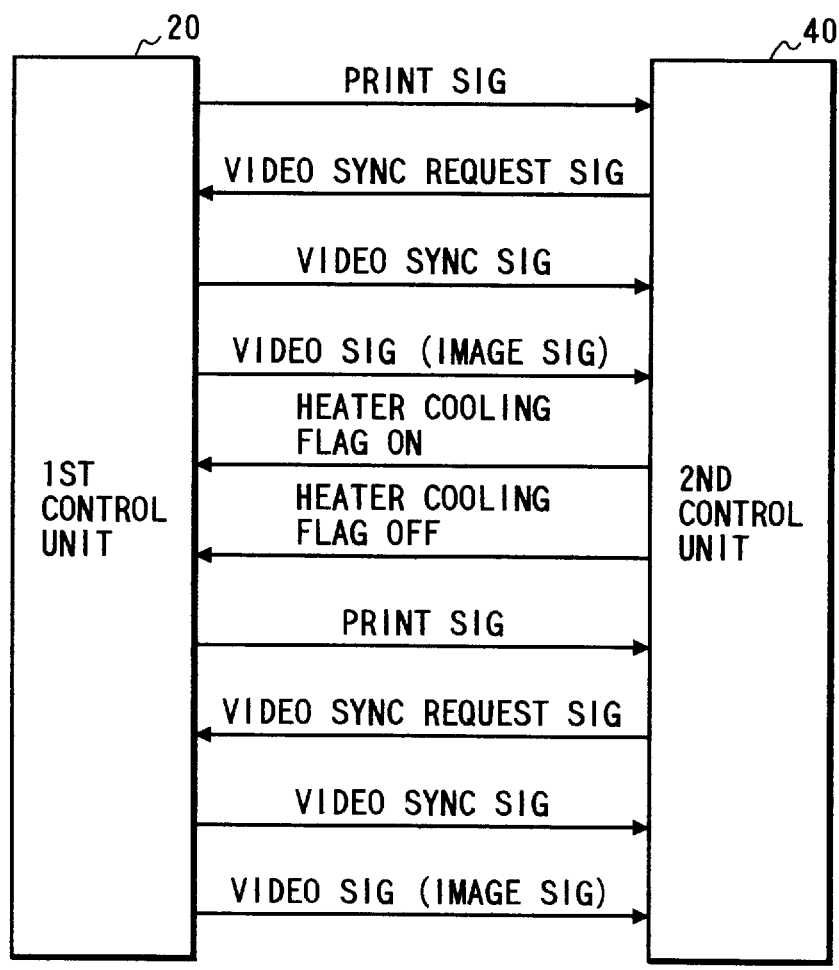
FIG. 2 illustrates the reception and transmission of signals between first and second control units of the facsimile apparatus of the embodiment.

FIG. 2 illustrates the transmission and reception of various signals between the first control unit 20 and the second control unit 40 of the facsimile apparatus. FIG. 2 shows a status when the temperature rise in the non-feed area exceeds a threshold at the end of the first recording of the image signal and the second control unit 40 sends flag information of "heater cooling" to the first control unit 20.

Referring to FIGS. 3 to 6, an operation of the facsimile apparatus is now explained.

Figure 3:
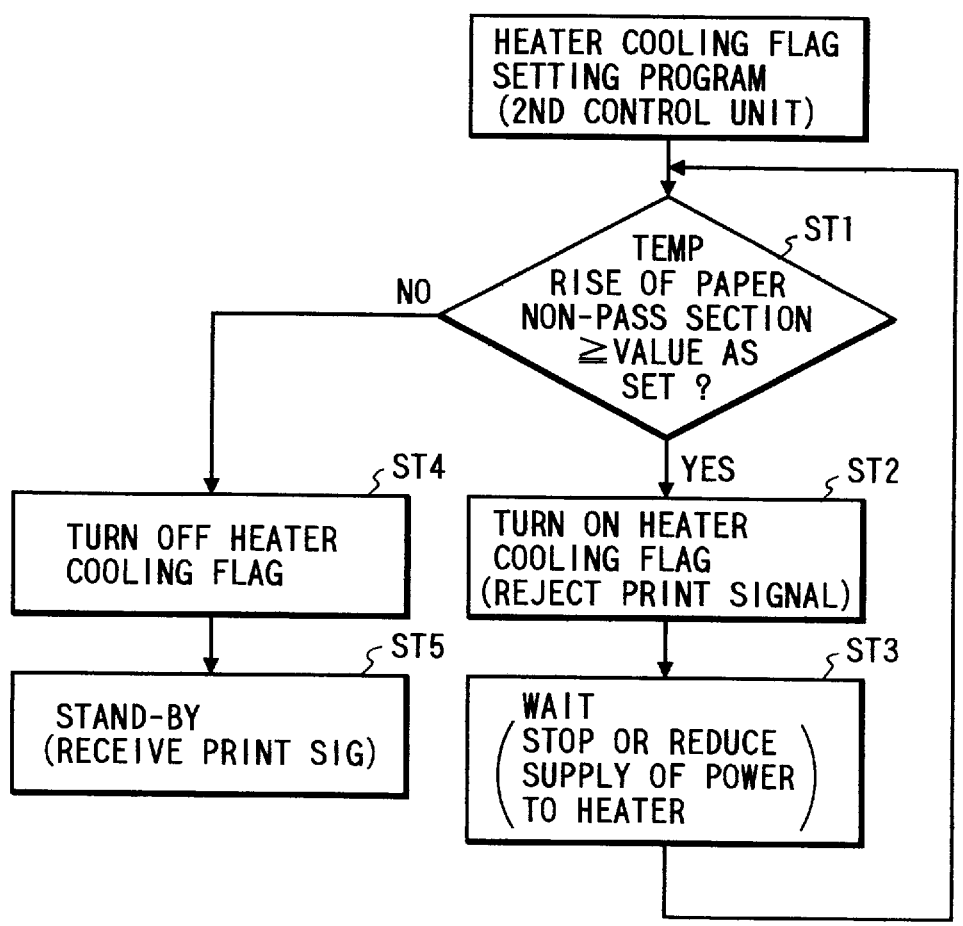
FIG. 3 shows an operation flow chart of the facsimile apparatus of the embodiment.

FIG. 3 shows an operation flow chart of the second control unit 40 of the facsimile apparatus, and it shows a flow chart of a setting program for the "heater cooling" flag of FIG. 2. This program is started after the completion of the reception of one page of video signal.

When the second control unit 40 determines that the temperature of the non-feed area is above the threshold (ST1) based on the result of detection of the temperature of the heater 32 by the second thermistor 34, the second control unit 40 sends a signal with the "heater cooling" flag turned on to the first control unit 20 (ST2). Under this state, the second control unit 40 does not accept a print signal from the first control unit 20. The second control unit 40 is in a stand-by state (to wait until the heater energization is interrupted or the heater energization is diminished and the temperature of the non-feed area drops) (ST3).

On the other hand, when the second control unit determines that the temperature of the non-feed area is not above the threshold based on the result of detection of the temperature of the non-feed area of the heater 32 by the second thermistor 34, the second control unit 40 sends a signal with the "heater cooling" flag turned off to the first control unit 20 (ST4). The second control unit 40 is in the stand-by state (to accept the print signal from the first control unit 20) (ST5).

Through the above operation, the excessive temperature rise of the non-feed area of the heater 32 is prevented while the image recording by page is assured.

Figure 4:
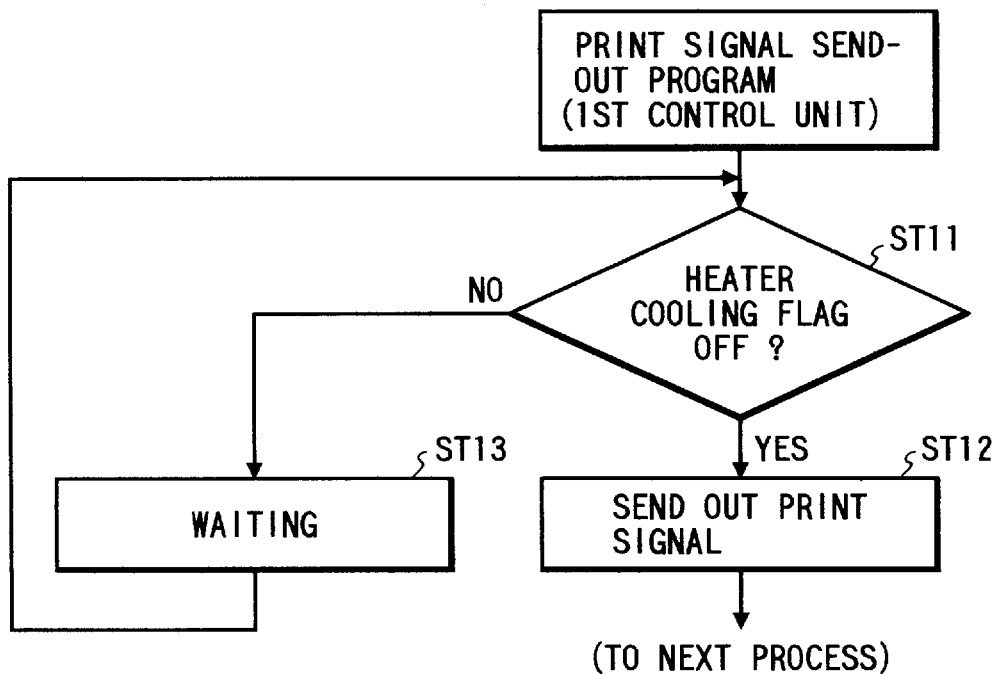
FIG. 4 shows an operation flow chart of the facsimile apparatus of the embodiment.

FIG. 4 shows an operation flow chart of the first control unit 20 of the facsimile apparatus. The first control unit 20 detects the off state of the heater cooling flag (ST1) from the second control unit 40 to send the print signal to the second control unit 40 (ST12). The first control unit 20 is in the stand-by state (ST13) when the heat cooling flag from the second control unit 40 is on.

Figure 5:
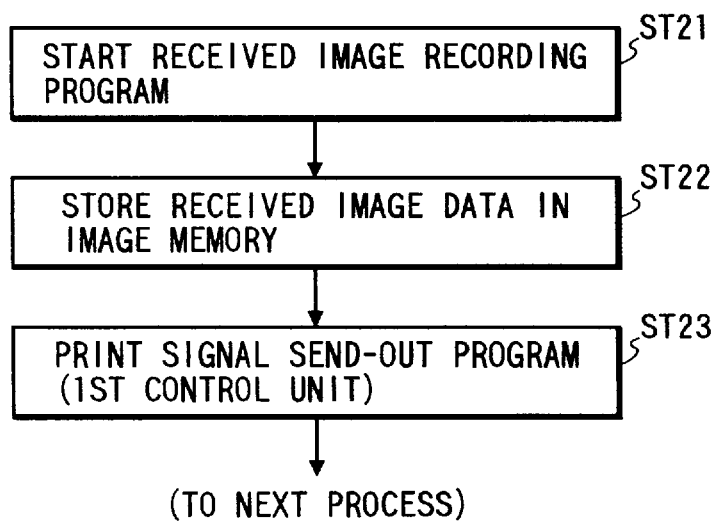
FIG. 5 shows an operation flow chart of the facsimile apparatus of the embodiment.

FIG. 5 shows a program for temporarily storing the received image data in the image memory 10 in the facsimile apparatus and sending the print signal. When the program is started (ST21), the received image data is stored in the image memory 10 under the control of the first control unit 20 while the recording operation of the first control unit 20 stands by (ST22), and thereafter the print signal is sent from the first control unit 20 to the second control unit 40 (ST23). The steps ST22 and ST23 are parallelly executed in a time-division fashion.

FIG. 6 shows a received image data recording program of the facsimile apparatus. When the program is started, the received image data is temporarily stored in the image memory 10 (ST31). The first control unit 20 determines whether the stored amount of the image memory 10 is above the threshold or not (ST32), and if it is above the threshold, the reception of the next page image stored in the image memory 10 is effected at a reduced speed (fall-back) (ST33). In this manner, the over-storage of the image memory 10 is prevented when temperature rise of the non-feed area of the heater 32 is excessive during the communication and the transfer of the image data to the second control unit 40 is to be stopped for an extended period.

On the other hand, if the stored amount of the image memory 10 is not above the threshold, the first control unit 20 sends the print signal to the second control unit 40 (ST34). The steps ST31 and ST34 are parallelly executed in a time-division fashion.

In the facsimile apparatus of the present embodiment, when the temperature rise of the non-feed area is high, the recording is not immediately stopped as an abnormal state so that when the temperature of the non-feed area drops, the recording operation is automatically resumed without requiring any action by the user. This is advantageous in a laser beam facsimile apparatus in which the received image is automatically recorded in an unattended manner.

The embodiment of the present invention may be modified in various manners without departing from the present invention. For example, the second control unit 40 may be constructed not to send back the record ready signal to the first control unit 20 to indicate the same effect as that of the heater cooling flag.

The present embodiment offers the following advantages.

It provides a facsimile apparatus in which the operation of the fixing unit of the laser beam printer is limited under the predetermined condition so that the undesired temperature rise in the non-feed area of the heater is prevented.

It provides a facsimile apparatus which prevents the temperature rise in the non-feed area of the heater while the image recording by page is assured.

It provides a facsimile apparatus which prevents the excessive temperature rise in the non-feed area of the heater without destroying the image data sent to the facsimile apparatus at a constant communication rate.

It provides a facsimile apparatus which can avoid the over-storage of the memory means.

What is claimed is:

1. A facsimile apparatus comprising:
   first control means for controlling communication processing of image data and an overall apparatus;
   a laser beam printer for feeding a record sheet through a heater mounted on a fixing unit to fix an image to the record sheet;
   temperature detection means for detecting temperatures in an area of the heater through which the record sheet is fed and in an area of the heater through which the record sheet is not fed; and
   second control means for restricting the communication processing of the image data from said first control means to said laser beam printer when the result of detection of the temperature of the area through which the record sheet is not fed by said temperature detection means exceeds a predetermined temperature;
   said second control means sending to said first control means a flag when the result of detection of the temperature in the area through which the record sheet is not fed by said temperature detection means exceeds a predetermined temperature;

said first control means controlling memory means for storing page image data and sending the next page image data stored in said memory means to said laser beam printer after confirmation that the flag from said second control means has been erased; and said first control means reducing a transmission rate of the next image data reception when the amount of image data temporarily stored in said memory means exceeds a predetermined level.

2. A facsimile apparatus comprising:

a printer for feeding a record sheet through a heater mounted on a fixing unit to fix an image to the record sheet;

temperature detection means for detecting temperatures in an area of the heater through which the record sheet is fed and in an area of the heater through which the record sheet is not fed; and control means for restricting printing of the image data by said printer in accordance with the result of detection of the temperature of the area through which the record sheet is not fed by said temperature detection means, which exceeds a predetermined temperature, and for controlling memory means for storing page image data.

3. A facsimile apparatus comprising:

reception means for receiving image data;

a printer for feeding a record sheet through a heater mounted on a fixing unit to fix an image to the record sheet;

temperature detection means for detecting temperatures in an area of the heater through which the record sheet is fed and in an area of the heater through which the record sheet is not fed;

first control means for restricting printing of the image data by said printer in accordance with the result of detection of the temperature of the area through which the record sheet is not fed by said temperature detection means, which exceeds a predetermined temperature; and second control means for controlling memory means for storing the received page image data, in accordance with the restriction of printing of the image data by said first control means.

* * * * *

UNITED STATES PATENT AND TRADEMARK OFFICE
CERTIFICATE OF CORRECTION

PATENT NO. : 5,844,694

DATED : December 1, 1998

INVENTOR(S) : SHIGEO MIURA

It is certified that error appears in the above-identified patent and that said Letters Patent is hereby corrected as shown below:

ON THE COVER PAGE:

ITEM [56] REFERENCES CITED, under FOREIGN PATENT DOCUMENTS, "4085645" should read --4-085645-- and "6138792" should read --6-138792--.

Signed and Sealed this

Tenth Day of August, 1999

Attest:

Q. TODD DICKINSON

Attesting Officer

Acting Commissioner of Patents and Trademarks